US00RE42966E

(19) United States
(12) Reissued Patent
Lifson et al.

(10) Patent Number: US RE42,966 E
(45) Date of Reissued Patent: Nov. 29, 2011

(54) TANDEM COMPRESSORS WITH DISCHARGE VALVE ON CONNECTING LINES

(75) Inventors: Alexander Lifson, Manlius, NY (US); Michael F. Taras, Fayetteville, NY (US)

(73) Assignee: Carrier Corporation, Syracuse, NY (US)

(21) Appl. No.: 11/397,888

(22) Filed: Apr. 4, 2006

Related U.S. Patent Documents

Reissue of:
(64) Patent No.: 6,966,192
Issued: Nov. 22, 2005
Appl. No.: 10/712,682
Filed: Nov. 13, 2003

(51) Int. Cl.
*F25B 1/10* (2006.01)

(52) U.S. Cl. ..... 62/196.2; 62/228.5; 62/510; 236/1 EA

(58) Field of Classification Search ..... 62/175, 62/510, 196.1, 196.2, 196.3, 228.1, 228.4, 62/228.5; 236/1 EA
See application file for complete search history.

(56) References Cited

U.S. PATENT DOCUMENTS

| | | | |
|---|---|---|---|
| 4,179,248 | A | 12/1979 | Shaw |
| 4,586,351 | A | 5/1986 | Igarashi et al. |
| 4,672,822 | A | 6/1987 | Iijima et al. |
| 4,876,859 | A | 10/1989 | Kitamoto |
| 5,094,598 | A | 3/1992 | Amata et al. |
| 5,875,637 | A | 3/1999 | Paetow |
| 6,446,462 | B1 | 9/2002 | Kiyokawa et al. |

OTHER PUBLICATIONS

Systems & Advanced Technologies Engineering S.r.l., publication entitled "Compsys—Dynamic Simulation of Gas Compression Plants", dated Jun. 12, 2002.
Copeland Europe publication entitled "Refrigeration Scroll for Parallel Applications" dated Feb. 26, 2002.

*Primary Examiner* — Marc E Norman
(74) *Attorney, Agent, or Firm* — Carlson, Gaskey & Olds, PC

(57) ABSTRACT

A refrigerant cycle is disclosed having a number of compressors operating in tandem and supplying a compressed refrigerant to a refrigerant system. Discharge lines communicate a compressed refrigerant to a central discharge line for receiving flow from all tandem compressors. A control is operational to determine a number of compressors need to be operated or whether some compressors should be shutdown to satisfy load requirements. Shutoff valves are placed on discharge lines outwardly of the shell of the compressors. That can be shutdown during part load operation. These shutoff valves are closed when their associated compressors are stopped to prevent backflow of refrigerant from operating compressors through the shutoff compressor, and into the system suction side. Additionally, high pressure differential across the compressor internal discharge check valve is eliminated and the possibility of compressor flooding through a discharge line is reduced. Thus, compressor/system performance is enhanced and reliability is improved.

5 Claims, 2 Drawing Sheets

TANDEM COMPRESSORS WITH DISCHARGE VALVE ON CONNECTING LINES

Matter enclosed in heavy brackets [ ] appears in the original patent but forms no part of this reissue specification; matter printed in italics indicates the additions made by reissue.

BACKGROUND OF THE INVENTION

This application relates to a shutoff valve placed on a connecting discharge line downstream of a compressor operating in a tandem compressor arrangement.

Refrigerant systems typically include a compressor delivering a compressed refrigerant from a compressor discharge port to a condenser, and then passing the refrigerant from the condenser to an expansion device, an evaporator, and then back to the compressor suction port. The load demand on the refrigerant cycle may vary. At times, there may be a need for a higher system cooling capacity and hence higher compressed refrigerant flow, and at other times, a lower cooling capacity and consequently lower refrigerant flow.

To provide continuous efficient supply of the desired amount of compressed refrigerant, some larger refrigerant systems utilize tandem compressors. In such systems, two compressors may simultaneously deliver a compressed refrigerant to a downstream heat exchanger, such as a condenser. Typically, fluid lines communicate with the discharge ports of the two compressors, and are merged into a single discharge line that sends refrigerant to the condenser. The system suction line is split in similar fashion into individual suction lines connecting to the suction port of each tandem compressor.

A control for such a tandem compressor system will operate one, or both of the compressors depending on system load. In situations where only one of the compressors is operational, the refrigerant can leak from a discharge line to suction line through the shutdown compressor. While the compressors are typically provided with a discharge check valve within the compressor shell, such check valves typically are not tight enough to prevent such leakage. Further, under high pressure differential, such check valves may distort and become even less fluid-tight, or malfunction. Thus, the prior art tandem compressors, even the ones with check valves within the compressor shell can have substantial leakage losses and subsequent system performance degradation.

SUMMARY OF THE INVENTION

In a disclosed embodiment of this invention, a shutoff valve is placed on the connecting discharge fluid line leading from at least one of the compressors to the common connection point of all tandem compressors. Preferably, the shutoff valve is positioned outwardly of a compressor shell. More preferably, the two compressors are connected by a pair of fluid lines leading to a central line supplying the downstream heat exchanger (e.g., the condenser).

A control for the shutoff valve may close a valve, blocking flow of refrigerant from an operational compressor from leaking through the discharge chamber of a non-operating compressor.

The present invention provides benefits in that it eliminates leakage losses that would otherwise occur in a tandem compressor arrangement having one compressor shutdown. Furthermore, continuous high pressure differential across the check valve will be eliminated as well.

These and other features of the present invention can be best understood from the following specification and drawings, the following of which is a brief description.

DETAILED DESCRIPTION OF THE PREFERRED EMBODIMENT

Figure 1:
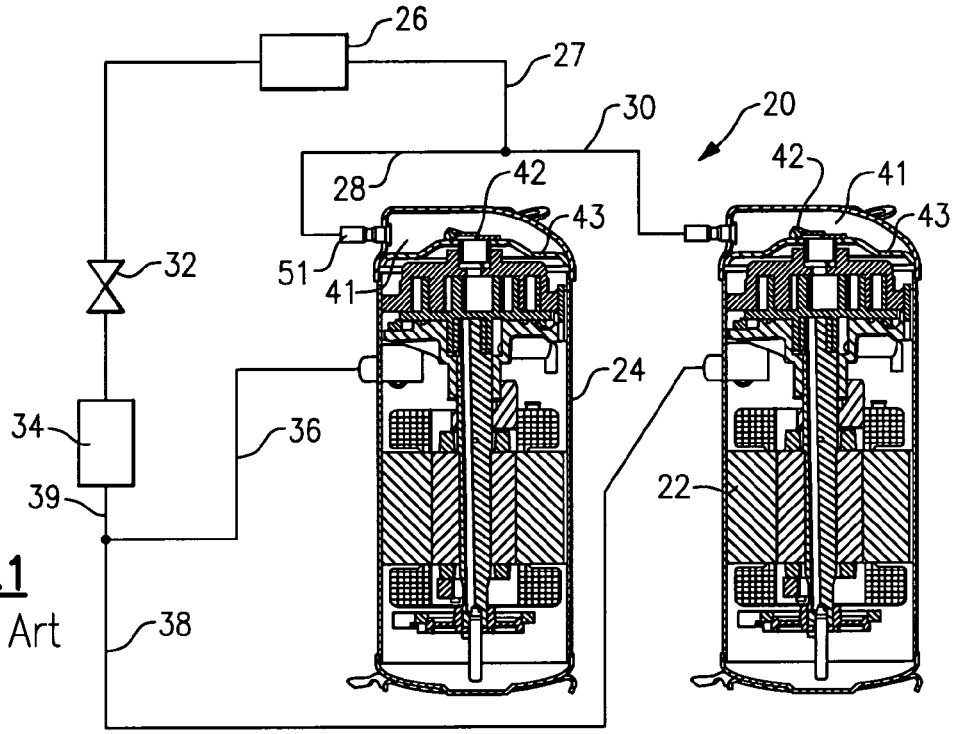
FIG.1 Prior Art
FIG. 1 shows a prior art compressor system.
Figure 2:
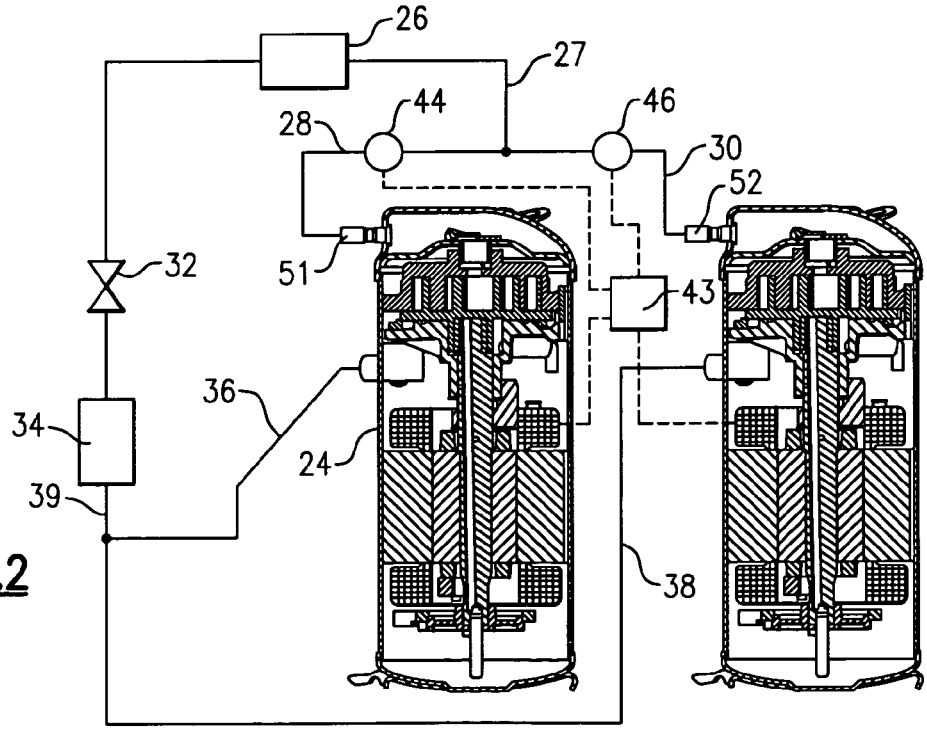
FIG. 2 shows the inventive compressor.
Figure 3:
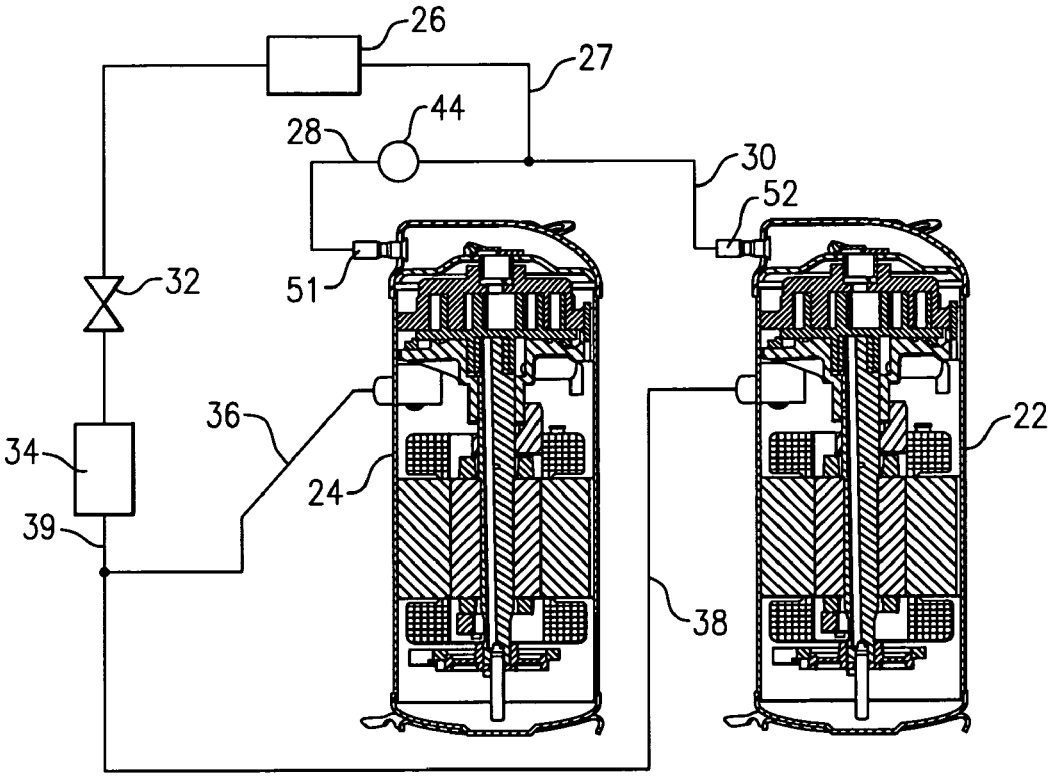

FIG. 1 shows a prior art refrigerant system 20 incorporating a pair of tandem compressors 22 and 24. As shown, the compressors 22 and 24 are preferably scroll compressors.

The compressors are provided with discharge ports (tubes) 51 and 52 that form a part of respective flow connecting discharge lines 28 and 30 leading to a central connecting discharge line 27 that communicates compressed refrigerant to condenser 26. From the condenser 26, refrigerant passes to an expansion device 32, and to an evaporator 34. From the evaporator 34, the refrigerant returns through common suction line 39 that branches off to individual suction lines 36 and 38 to the interior shell of each compressor.

As is known, an upper part 41 of the compressor is at a discharge pressure. A check valve 42 is typically placed such as in a separator plate 43 within the scroll compressor.

In the prior art, a control for the tandem compressors may shutdown one of compressors 22 and 24 when a lower demand for cooling capacity is present and hence lower refrigerant flow is desirable. Say that compressor 22 is shutdown. Now, compressor 24 is delivering compressed refrigerant to line 28 and consequently to line 27, since they are in direct communication with each other. However, a portion of this compressed refrigerant can undesirably pass through line 30 back into the discharge chamber 41 of the compressor 22. While check valve 42 will resist flow somewhat, these check valves may be inherently leaky allowing refrigerant to bleed at shutdown. Thus, some of the compressed refrigerant flowing from line 30 into chamber 41 will bleed past the check valve 42 directly to compressor 22 and refrigerant system 20 suction side. This high to low leak is undesirable and leads to system performance loss.

Thus, the present invention provides a control 43 for operating the two compressors 22 and 24. Control 43 further controls a pair of shutoff valves 44 and 46. While it is desired that both lines 30 and 28 have a shutoff valve, it is within the teachings of this invention that only one of the two lines be provided with a check valve, since in many occasions, a specific compressor(s) is(are) dedicated for part-load operation while the other one(s) is(are) being shutdown.

Now, if the control 43 determines that only one compressor operation is necessary, the shutoff valve 44 or 46 associated with the other compressor is closed, and this other compressor is shutdown. Then, as the compressor (say 24) continues to operate, compressed refrigerant is delivered from compressor discharge port 51 through line 28, to line 27, and to condenser 26. There will be no leakage losses through the line 30, as shutoff valve 46 will be closed to block such leakage.

Furthermore, continuous high pressure differential across the check valve will be eliminated as well.

An additional advantage of having a leak-tight valve located on the compressor discharge line is that fluid migration from the condenser into the compressor is prevented. This alleviates the possibility of having a flooded compressor at startup.

The shutoff valve, for example, may be a controlled solenoid valve, or may be a very fluid-tight check valve or any other type of valve. If a solenoid valve is utilized, most preferably it will be a valve that is biased to a normally open position such that upon failure, there is no restriction to flow through the shutoff valve. Furthermore, if a solenoid valve is employed, it will be opened shortly before the compressor start-up to prevent flow blockage in discharge line when the compressor is started.

While the present invention has been disclosed in a conventional air conditioning system, it should be understood that the invention would also extend to a heat pump having both cooling and heating modes. In a heating mode, the flow of refrigerant would be initially to the heat exchanger 34, which is an evaporator in the cooling mode, but is more generically an indoor heat exchanger. Some modification of the system would be necessary to achieve this dual flow, however a worker of ordinary skill in the art would recognize how to provide such flow management.

Furthermore, although the invention primarily describes scroll compressors, other compressor types, such as screw, rotary, etc., may benefit from the teachings of this invention as well. Also, a number of compressors in the tandem arrangement can be extended indefinitely with the shutoff valves placed on a discharge side of the compressors that will be shutdown during part-load operation.

Finally, it should be noted that tandem compressor arrangement may include an oil equalization line, connecting oil sumps of the tandem compressors, for oil management and a vapor equalization line, connecting shells (low pressure side) of the tandem compressors for pressure equalization.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

[1. A refrigerant cycle comprising:

at least two tandem compressors, said tandem compressors having outlets communicating with discharge fluid flow lines, and merging downstream of housing shells for said tandem compressors;

a first heat exchanger downstream of a merger point for said discharge fluid flow lines, an expansion device between said first heat exchanger, and a second heat exchanger upstream of said tandem compressors; and a shutoff valve mounted on at least one of said discharge fluid flow lines communicating said discharge of said at least one compressor to said merger point, a control being operable to shutdown at least one of said tandem compressors, said shutoff valve blocking flow from the other of said tandem compressors to said at least one compressor, when said at least one compressor is shutdown, said shutoff valve being electrically controlled by said control, and said control being programmed to selectively actuate said shutoff valve associated with one of said tandem compressors while allowing the other of said tandem compressors to continue to run and have an open shutoff valve.]

[2. A refrigerant cycle as set forth in claim 1, wherein said shutoff valve is a solenoid valve.]

[3. A refrigerant cycle as set forth in claim 1, wherein said shutoff valve is normally biased to be open, but is electrically driven to a closed position.]

[4. A refrigerant cycle as set forth in claim 1, wherein said compressors are scroll compressors.]

[5. A refrigerant cycle as set forth in claim 1, wherein said discharge valve is mounted in the compressor discharge port.]

[6. A refrigerant cycle as set forth in claim 1, wherein said shutoff valve is mounted outwardly of said housing shell.]

[7. A refrigerant cycle as set forth in claim 1, wherein said shutoff valve is a check valve.]

8. A method of operating a refrigerant cycle comprising the steps of:

(1) providing at least two compressors, said compressors communicating a compressed refrigerant to a downstream merger location;

(2) providing a control for operating said compressors, said control being operable to shutdown at least one of said compressors dependent on a determined load; and (3) providing a shutoff valve on the discharge fluid flow line of said tandem compressors to said merger location for said compressors, and said shutoff valve being closed to block flow through said fluid line from an operational compressor or compressors to a shutdown compressor or compressors when at least one of said compressors is shutdown, said control selectively determining that one of said at least two compressors should be operational and the other should be stopped, and closing said shutoff valve associated with said compressor that has been determined to be desirably stopped.

9. A method as set forth in claim 8, wherein a control opens a shutoff valve shortly before a compressor start-up.

10. A method as set forth in claim 8, wherein a control opens a shutoff valve immediately after, or at the time of, a compressor startup.

11. A refrigerant cycle comprising:

at least two tandem compressors, said tandem compressors having outlets communicating with discharge fluid flow lines, and merging downstream of housing shells for said tandem compressors, said tandem compressors each being scroll compressors, said compressors having a discharge valve immediately downstream of a compressor pump unit, and within said housing shell;

a first heat exchanger downstream of a merger point for said discharge fluid flow lines, an expansion device between said first heat exchanger, and a second heat exchanger upstream of said tandem compressors; and a shutoff valve mounted on at least one of said discharge fluid flow lines communicating said discharge of at least one compressor to said merger point, a control being operable to shutdown *at least* one of said tandem compressors, said shutoff valve blocking flow from the other of said tandem compressors to said at least one compressor, when said at least one compressor is shutdown, said shutoff valve being mounted outwardly of said housing shell, said shutoff valve being electrically controlled by said control, and said control being programmed to selectively actuate said shutoff valve associated with one of said tandem compressors while allowing the other of said tandem compressors to continue to run with an open shutoff valve.

12. A refrigerant cycle as set forth in claim 11, wherein said shutoff valve is a solenoid valve.

[13. A refrigerant cycle as set forth in claim 12, wherein said shutoff valve is normally biased to be open, but is electrically driven to a closed position.]

* * * * *